(12) United States Patent
Bewlay et al.

(10) Patent No.: US 10,384,808 B2
(45) Date of Patent: Aug. 20, 2019

(54) CONTROL SYSTEM AND METHOD

(71) Applicant: General Electric Company, Schenectady, NY (US)

(72) Inventors: Bernard Patrick Bewlay, Niskayuna, NY (US); Byron Pritchard, Cincinnati, OH (US); Shankar Sivaramakrishnan, Schenectady, NY (US); Ambarish Kulkarni, Niskayuna, NY (US); Hrishikesh Keshavan, Niskayuna, NY (US); Mehmet Dede, Cincinnati, OH (US); Larry Rosenzweig, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 166 days.

(21) Appl. No.: 15/368,185

(22) Filed: Dec. 2, 2016

(65) Prior Publication Data

US 2018/0155061 A1 Jun. 7, 2018

(51) Int. Cl.
*B64D 27/10* (2006.01)
*B64F 5/40* (2017.01)
(Continued)

(52) U.S. Cl.
CPC ............... *B64F 5/60* (2017.01); *B64D 27/10* (2013.01); *B64F 5/40* (2017.01); *F01D 5/288* (2013.01);
(Continued)

(58) Field of Classification Search
CPC .. B64F 5/60; B64F 5/40; F01D 21/003; F01D 5/288; F02C 3/04; G05B 23/0283;
(Continued)

(56) References Cited

U.S. PATENT DOCUMENTS 6,010,746 A 1/2000 Descoteaux et al.
7,582,359 B2 9/2009 Sabol et al.
(Continued)

FOREIGN PATENT DOCUMENTS

EP 2 889 711 A2 7/2015
WO 2012/151150 A1 11/2012
(Continued)

OTHER PUBLICATIONS

Steinke, Tanja, et al. "A novel test approach for plasma-sprayed coatings tested simultaneously under CMAS and thermal gradient cycling conditions." Surface and Coatings Technology 205.7 (2010): 2287-2295. (Year: 2010).*

(Continued)

*Primary Examiner* — Alan D Hutchinson
(74) *Attorney, Agent, or Firm* — Christopher R. Carroll; The Small Patent Law Group LLC

(57) ABSTRACT

A control system having one or more controllers configured to determine a maintenance date of an engine based on monitored parameters of the engine of an aircraft. The one or more controllers also are configured to, determine an amount of coating sprayed on the engine on the determined maintenance date based on the monitored parameters and determined maintenance date. The one or more controllers also are configured to adjust the maintenance date based on needs of an aircraft fleet and regularly scheduled maintenance of the engine.

24 Claims, 4 Drawing Sheets

(51) Int. Cl.
*B64F 5/60* (2017.01)
*F01D 21/00* (2006.01)
*F02C 3/04* (2006.01)
*F01D 5/28* (2006.01)
*G05B 23/02* (2006.01)
*B64D 45/00* (2006.01)

(52) U.S. Cl.
CPC .............. *F01D 21/003* (2013.01); *F02C 3/04* (2013.01); *G05B 23/0283* (2013.01); *B64D 2045/0085* (2013.01); *F05D 2220/323* (2013.01); *F05D 2230/72* (2013.01); *F05D 2230/90* (2013.01); *F05D 2240/35* (2013.01); *F05D 2260/82* (2013.01); *F05D 2270/11* (2013.01); *F05D 2270/303* (2013.01); *G05B 2219/45071* (2013.01); *Y02T 50/6765* (2018.05)

(58) Field of Classification Search
CPC ............ B64D 27/10; B64D 2045/0085; F05D 2220/323; F05D 2260/82; F05D 2270/303; F05D 2230/72; F05D 2230/90; F05D 2240/35; F05D 2270/11
See application file for complete search history.

(56) References Cited

U.S. PATENT DOCUMENTS

| | | | |
|---|---|---|---|
| 8,221,825 | B2 | 7/2012 | Reitz et al. |
| 8,356,482 | B2 | 1/2013 | Duval et al. |
| 8,470,460 | B2 | 6/2013 | Lee |
| 8,742,944 | B2 | 6/2014 | Mitchell et al. |
| 8,986,778 | B2 | 3/2015 | Zombo |
| 9,102,015 | B2 | 8/2015 | Kulkarni et al. |
| 9,341,586 | B2 | 5/2016 | Henderkott et al. |
| 9,395,301 | B2 | 7/2016 | Cheverton et al. |
| 2003/0221315 | A1 | 12/2003 | Baumann et al. |
| 2009/0169752 | A1 | 7/2009 | Fu et al. |
| 2009/0252985 | A1 | 10/2009 | Nagaraj et al. |
| 2012/0283963 | A1* | 11/2012 | Mitchell ................. F01D 17/02 702/34 |
| 2015/0355055 | A1 | 12/2015 | Utay |
| 2016/0160679 | A1 | 6/2016 | Griffiths et al. |
| 2017/0361919 | A1* | 12/2017 | Waddleton .............. B64C 11/38 |
| 2018/0154381 | A1 | 6/2018 | Bewlay et al. |

FOREIGN PATENT DOCUMENTS

| | | |
|---|---|---|
| WO | 2015/086957 A2 | 6/2015 |
| WO | 2015116300 A2 | 8/2015 |

OTHER PUBLICATIONS

Rai et al.; CMAS-Resistant Thermal Barrier Coatings (TBC); International Journal of Applied Ceramic Technology; May 2009; vol. 7, Issue 5; pp. 662-674.

Bilge et al; CMAS-Resistant Plasma Sprayed Thermal Barrier Coatings Based on Y2O3-Stabilized ZrO2 with Al3+ and Ti4+ Solute Additions; Journal of Thermal Spray Technology; Apr. 2014; vol. 23, Issue 4; pp. 708-715.

Wu et al.; Evaluation of Plasma Sprayed YSZ Thermal Barrier Coatings with the CMAS Deposits Infiltration using Impedance Spectroscopy; Progress in Natural Science: Materials International; Feb. 2012; vol. 22, Issue 1; pp. 40-47.

Extended European Search Report and Opinion issued in connection with corresponding EP Application No. 17204886.0 dated May 3, 2018.

Kulkarni, A.J., et al., Coating system and method, GE Co-pending U.S. Appl. No. 15/966,350, filed Apr. 30, 2018.

* cited by examiner

CONTROL SYSTEM AND METHOD

FIELD

The subject matter described herein relates to engine maintenance, and to a control system for scheduling maintenance of an engine.

BACKGROUND

Turbine engines in commercial aircraft have routine maintenance schedules to ensure the engines are optimally performing. However, different components and features of the engine react differently to engine wear and use over time, depending on factors such as the extent of use and environmental conditions to which the engine is exposed.

A thermal barrier coating may be used in the turbine engine to protect the engine from negative effects caused by heat within the engine. Over time, such thermal barrier coatings degrade during use or service of the turbine as a result of spallation and damage, such as exposure to exhaust heat wearing down the coating. As the thermal barrier degrades, the turbine is more susceptible to failures and the coating may need to be restored or replaced. Typically, the thermal barrier coating is restored at regularly scheduled maintenance intervals by disassembling the turbine engine so that a restorative thermal barrier coating can be applied.

This maintenance of the aircraft results in significant down time and expense. As a result of aircraft operation conditions, environmental conditions during operation, and quality of the thermal barrier coating, the thermal barrier coating does not wear and degrade in the same manner for each individual aircraft. Thus, a thermal barrier coating may need to be restored at intervals that do not coincide with the regularly scheduled maintenance schedule of the engine or aircraft. The end result is either reduced engine performance resulting from a coating in use that needs to be restored, or unnecessary down time spent restoring a coating that does not need to be restored.

BRIEF DESCRIPTION

In one embodiment, a control system is provided. The control system has one or more controllers configured to determine when to extend a life span of a coating of an engine by applying an additive to the coating based on one or more monitored parameters of the engine. The one or more controllers also are configured to, direct the applied additive to the coating based on the monitored parameters of the engine.

In one embodiment, a method of coating an engine is provided. Steps include monitoring engine parameters with one or more controllers and determining an engine maintenance date with the one or more controllers based on the monitored engine parameters. A coating restoration system having a mobile spray device is provided and coats the engine with the spray device on the engine maintenance date based on the monitored engine parameters.

In one embodiment a control system is provided with one or more controllers configured to monitor one or more parameters of an engine. The one or more controllers also are configured to determine an additive application to direct on the engine based on the one or more monitored parameters of the engine.

DETAILED DESCRIPTION

Figure 1:
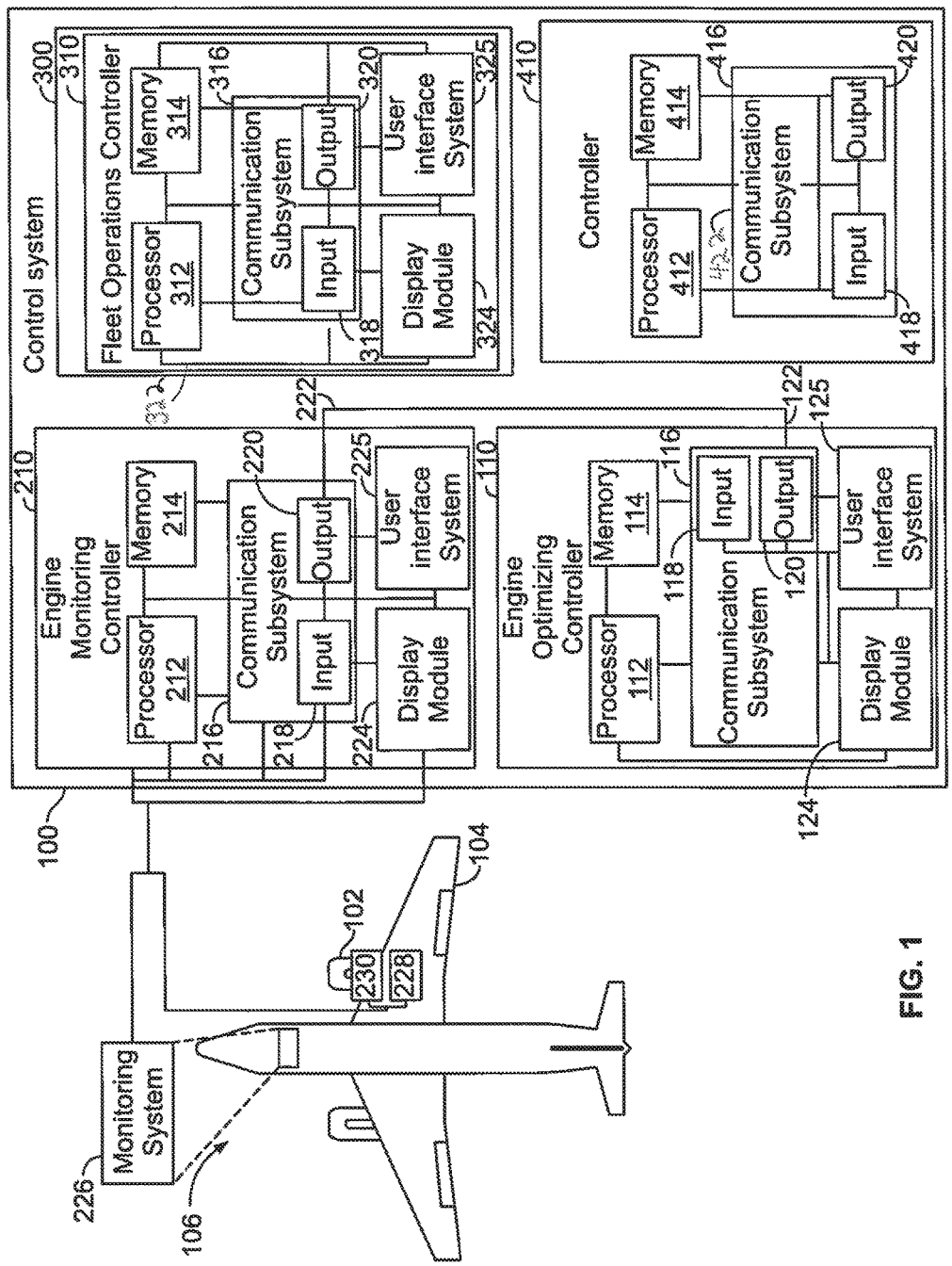
FIG. 1 is a schematic diagram of a control system for determining coating restoration maintenance in accordance with one embodiment.

A control system has one or more engine controllers that are configured to provide an analytics-based engine to restore protective coatings, such as thermal barrier coatings, on turbine components. The one or more engine controllers use engine parameters such as engine operating data, data and information received from a monitoring system or engine monitoring controller, data and information inputted into the one or more controllers of a coating restoration system, data and information received from an auxiliary control controller or system such as a vehicle (e.g., aircraft or other type of vehicle) control system and the like to identify coating degradation and schedule a coating restoration procedure.

The control system monitors engine performance or operational parameters, and responsive to detection of degradation, one or more coatings within the engine are restored while the engine is still in an installed configuration with reduced disruption to the operation of the powered system in which the engine is disposed. The installation can occur during an on-wing configuration for an aircraft engine, or in a field installation for an industrial power turbine. The one or more engine controllers are configured to communicate with one or more controllers of a coating restoration system and/or determine when a coating restoration system is to perform the restoration. The coating restoration system includes a mobile supply unit and a spray nozzle coupled to the supply unit. The spray nozzle provides the coating in a slurry form onto components inside the engine. The mobile supply unit of the coating restoration system could include a power supply, an air supply, a water supply and a coating restoration system mounted to a transport vehicle. The coating restoration application system supplies and stores the restoration coating agent so that it can be delivered to the spray nozzle for application in the turbine engine. The mobile supply unit for providing the coating restoration could be in the back of a truck; the mobile supply unit may be incorporated into a work cart, trailer, or other type of vehicle or support structure.

The one or more engine controllers are in communication with components of the gas turbine engines and the coating restoration system by communication links (e.g., including wired and/or wireless, direct or indirect, connections). The control system also includes a monitoring system that is in communication with the one or more engine controllers. The monitoring system has an engine performance monitor that monitors engine use data such that the one or more engine controllers can use the data to determine or predict when a coating restoration of a component such as a turbine engine should be performed. The engine use data can include data including full flight and full service exposure data for the turbine engine, the environmental conditions in which the turbine engine has operated and the like. The one or more engine controllers are configured to determine the efficacy of a selected or recommended coating restoration procedure. The one or more engine controllers can also determine a coating restoration schedule that is optimal given a specified optimization objective (e.g., prolong engine life, improve performance, or improve efficiency), based on historical engine data and/or other engine operational data. The one or more engine controllers make the determinations by making calculations using an algorithm, comparing data to historical engine data in a look-up table, or the like.

The control system comprises one or more hardware components, software components or computer-executable components and data structures including an optimization routine. The one or more engine controllers interface with the monitoring system to create a coating restoration schedule for a turbine engine, in order to maximize performance of the turbine engine and minimize maintenance costs. The one or more engine controllers make determinations and perform calculations based on data and information received from the monitoring system. The one or more engine controllers estimate improved engine life resulting from a coating restoration of the turbine engine system based on engine performance data from and engine received by the monitoring system. The optimization routine employs all of the inputs received by the one or more engine controllers and determines whether and when a coating restoration is necessary.

The one or more engine controllers utilize the engine performance information generated by the engine performance monitor to predict when a coating restoration will be necessary or desired in order to maintain or improve the performance of a turbine engine system. If the performance of the engine is severely degraded, the one or more engine controllers are configured to initiate a single coating restoration event. If an engine is operating normally, the one or more engine controllers are configured to generate a coating restoration schedule for the engine at time intervals based on a number of coating restoration schedule criteria. These criteria include the turbine engine's flight plans, normal operating conditions (e.g., short or long duration missions, altitude, humidity, frequency of accelerations vs. cruising segments, etc.), characteristics of the coating restoration technique, and the like.

The monitoring system can include one or more engine monitoring controllers that communicate and are linked to the one or more engine controllers. The one or more engine monitoring controllers receive the information from the engine performance monitor and are part of and communicate with the turbine engine and the engine controller of an aircraft. The one or more engine monitoring controllers can be the engine controller of an aircraft. The one or more engine monitoring controllers may be a Full Authority Digital Engine Controller (FADEC), a component thereof, or a separate module in communication with a FADEC (e.g., via one or more electronic communication links or networks). Optionally, the monitoring system includes an on-board engine monitor, of a range of characteristics, such as the frequency of data acquisition.

The one or more engine monitoring controllers also include hardware, firmware, and/or software components that are configured to perform a range of functions such as communicating and utilizing information and data, making determinations including calculation based on information and data and the like similar to the one or more engine controllers. The one or more engine monitoring controllers include a processor (e.g. a controller, microprocessor, microcontroller, digital signal processor, etc.), memory, and an input/output (I/O) subsystem. The one or more engine monitoring controllers can be a laptop computer, or mobile device (e.g., a tablet computer, smart phone, body-mounted device or wearable device, etc.), a server, an enterprise computer system, a network of computers or the like.

The input and output subsystems of the one or more engine monitoring controllers are communicatively coupled to a number of hardware, firmware, and/or software components, including a data storage device, a display, a user interface subsystem, a communication subsystem, the engine performance monitor of the monitoring system and the one or more engine optimization controllers. Portions of the engine performance monitor and the one or more controllers of the control system may reside at least temporarily in the data storage device and/or other data storage devices that are part of a fleet management system.

The communication subsystem of the one or more engine monitoring controllers connects the one or more engine monitoring controllers to other computing devices and/or systems by one or more networks. The network(s) may be a cellular network, a local area network, a wide area network (e.g., Wi-Fi), a cloud, a virtual personal network (e.g., VPN), an Ethernet network, and/or a public network such as the Internet. The communication subsystem may, alternatively or in addition, enable shorter-range wireless communications between the one or more engine monitoring controllers and other computing devices, using, for example, Bluetooth and/or other technology. Accordingly, the communication sub-system may include one or more optical, wired and/or wireless network interface subsystems, cards, adapters, or other devices, as may be needed pursuant to the specifications and/or design of the particular engine monitoring controller.

The control system can also include one or more fleet operations controllers that are in communication with the one or more engine controllers such that scheduling determinations are communicated to the one or more fleet operations controllers. Thus, in addition to single engine coating restoration schedule optimization, full fleet optimization is also considered. A communication system of the one or more engine controllers communicates outputs of one or more of the engine performance monitor, the one or more engine monitoring controllers and/or the one or more engine controllers to the one or more fleet operations controllers and/or the one or more controllers of the coating restoration system. Portions of engine health data and/or coating restoration schedule data, may be supplied to the one or more fleet operations controllers and/or the one or more controllers of the coating restoration system. Therefore, the one or more fleet operations controllers are configured to manage turbine engine coating restoration for a fleet of aircraft.

The one or more engine monitoring controllers compare the real-time engine operating conditions to historical data of similar engines that are considered to be operating appropriately. By monitoring historical operational data of the engine in a test cell or of similar engines that are operating appropriately, an engine profile is developed over time using model-based control algorithms. Based on the comparison of the real-time operating conditions to the engine profile, the one or more monitoring engine controllers or the one or more engine monitoring controllers predict or determine the engine performance at a particular time. Therefore, after an engine is built, the engine is tested in a test cell to make sure that it meets the performance requirements to ensure the engine is operating normally before use in the field. The data for each engine is acquired in a test cell and then incorporated into the model-based control algorithm so the control algorithm can determine an engine profile.

This test information for specific engines is used to build the control algorithms, and then, on-wing, the measured engine output is compared to this engine profile at a specific point in the engine life that is under consideration. Thus, the turbine parameters such as temperature and turbine component temperatures can be measured in a test cell and these measurements can be compared with subsequent on-wing temperature measurements. If the difference between the measurements obtained in the test cell and the measurements obtained on-wing) exceeds certain prescribed values, then the one or more engine controllers or one or more engine monitoring controllers are configured to determine that the turbine temperature is deteriorating over time, and a coating restoration is required. A predetermined range can be set for each parameter or combination of parameters. Then based on whether the parameter, combination of parameters, calculated parameters or the like fall within the predetermined range, the one or more engine controllers schedules a time for restoration of the coatings.

The one or more controllers of the coating restoration system can be one or more computing devices configured to manage engine coating restoration services. The one or more controllers of the coating restoration system are operated by an engine coating restoration service, such as at an A check, C check, or procedure at an airport. The one or more controllers of a coating restoration system is in communication with all of the other controllers of the control system, including the one or more engine controllers, one or more fleet operations controllers, and the one or more engine monitoring controllers. The one or more controllers of a coating restoration system includes an engine coating restoration history database and a coating restoration parameters database. The engine coating restoration database stores information related to the coating restoration history of the turbine engine system, such as, when was the date of the last coating restoration of the turbine engine and what coating restoration was performed.

The engine coating restoration history can also be stored on the engine maintenance history database. The coating restoration parameters database includes information related to the coating restoration regimens available to be used to restore a particular turbine engine, such as data on all available coating restoration regimens, which coating restoration regimens are available at which locations geographically, whether a coating restoration crew at a particular location is available to perform a coating restoration, and the like. All historical data stored at the one or more controllers of the coating restoration system is communicated to all of the controllers within the control system to be utilized in determinations, calculations, algorithms and as otherwise needed by the controllers within the control system.

The one or more controllers of the coating restoration system obtains and stores historical data about the engine or the engine's coating restoration history. This is through data inputted into the one or more controllers and data determined in real-time and stored within the memories of the one or more controllers. The one or more controllers of the coating restoration system are configured to use historical data to determine an engine coating restoration scheme for the operator. The one or more controllers of the coating restoration system communicate with the other controllers in the control system to schedule maintenance intervals based upon certain parts or modules of the turbine engine that need replacement. Thus, the one or more controllers of the coating restoration system are configured to determine the amount of restoration required for an individual component or module. Consequently, the one or more controllers of the coating restoration system are configured to determine if an engine merely needs a minor overhaul/restoration procedure, and based on the restoration required the one or more controllers of the coating restoration system initiate a coating restoration. As a result, the engine coating or coatings are restored and the engine is quickly returned to service, thereby extending the engine's efficiency until a major overhaul is required.

The one or more controllers of the coating restoration system are configured to monitor multiple parameters of the engine including and in addition to the historical data. Such parameters of the engine include one or more of an engine exhaust temperature, a condition of the coating of the engine, engine fuel flow, compressor exit pressure, compressor exit temperature, engine derating, engine speed, engine cycles, engine power use, auxiliary power use, environmental conditions, ambient airplane temperature or dates of engine use. The condition of the coating may be or represent the presence or absence of spalling in the coating, and/or an amount (e.g., number) of spalling or locations of spalling. The engine derating may occur when the output of the engine is less than a directed output. For example, an engine that remains at the same throttle position may derate when the power output by the engine decreases (while remaining at the same throttle position). The number of engine cycles represents the number of times that the engine is turned on from an inactive or off state, the engine operates for a period of time to perform work, and the engine is then deactivated or turned to an off state. The auxiliary power use may indicate how much work performed by the engine (e.g., how much current generated by operation of the engine) is used for auxiliary power consumption, such as for powering loads that do not propel a vehicle. The environmental conditions may indicate the presence (or absence) of dust in the environment in which the engine operates, and/or the ambient temperatures in which the engine operates.

Other parameters may include operational parameters indicative of operations or work performed by the engine or components of the engine. In one embodiment, the operational parameters may indicate the temperature, air flow, time of usage, etc., of hot gas components of the engine, such as that of a combustor, turbine blade, turbine vane, turbine vane, turbine shroud, and/or combustor fuel nozzle.

Different parameters may impact when the additive is to be added to the coating in different ways. For example, hotter engine exhaust temperatures may require application of the additive sooner than for cooler engine exhaust temperatures. The presence of spalling and/or a greater amount or degree of spalling may require application of the additive sooner than for an absence or smaller amount or degree of spalling. Greater amounts of fuel flowing to the engine may require application of the additive sooner than for lesser amounts of fuel flowing to the engine. Increased compressor exit pressures and/or temperatures may require application of the additive sooner than for smaller or cooler compressor exit pressures and/or temperatures. Derating of the engine may indicate that application of the additive needs to occur sooner than for engines that do not derate or that derate by a lesser amount. Engines operating at faster engine speeds and/or over more engine cycles may require application of the additive to the coating sooner than for slower engine speeds and/or fewer engine cycles. Engines producing greater amounts of power (e.g., relative to a designated threshold) may require application of the additive to the coating sooner than for engines producing lesser amounts of power. Engines that operate to power greater amounts of auxiliary loads may require application of the additive to the coating sooner than for engines powering less or fewer auxiliary loads.

The one or more controllers of the coating restoration system are configured to issue a prompt or notification in order to prevent the occurrence of a scheduled coating restoration cycle, if the one or more controllers of the coating restoration system determines that the engine's removal from service is imminent (e.g., for regularly scheduled required maintenance). The one or more controllers of the coating restoration system include data in a database or memory regarding the date on which predetermined maintenance is to occur. The one or more controllers of the coating restoration system then compare a date of maintenance determined as a result of system parameters and if the date falls within a predetermined range, such as one month, of the date of the predetermined maintenance, the one or more controllers of the coating restoration system are configured to cancel the determined date of maintenance.

The maintenance includes restoring a coating at different points in the operational life of the engine that results in different prolonged life of the coating. In one embodiment, an additive is applied to the coating to extend the life span of the engine by 100% or more compared to if no restorative coating was provided. In another embodiment, after some life span, the additive is applied to extend engine life by 25% the initial life span. Otherwise if applied after some small spalling, life can be extended by 10% the life span. Alternatively, if the restorative coating is applied after large spalling, an additional life span can be added as a result of the coating.

Thus, the one or more controllers of the coating restoration system are configured to coordinate coating restoration cycles with other maintenance schedules as well as operational schedules. The one or more controllers of the coating restoration system are configured to establish the best variation of cycle times in which the optimum parameters of engine coating restoration are determined, including the time interval between coating restoration(s), the duration of coating restoration(s), the particular mixture or composition of the coating restoration solution, and the like. The one or more controllers of the coating restoration system are configured to establish a predictive coating restoration schedule based on the historical data. The predictive coating restoration schedule can then be used by the engine manufacturer in order to better predict engine coating restoration as a function of minor and major overhaul intervals.

The term "database" may refer to, among other things, a computerized data structure capable of storing information for easy retrieval (e.g., a keyword search) or a computer program command. Portions of each database may be embodied as, for example, a file, a table, or a database. While not specifically shown, the fleet management system may include other computing devices (e.g., servers, mobile computing devices, etc.), which may be in communication with each other and/or the other controllers in the control system.

One turbine engine considered is a multiple shaft turbofan gas turbine engine. The aspects of the present disclosure are applicable to turbine engines in general. Other types of turbine engines include turboprop and turboshaft systems, as well as turbine engines designed for non-aerospace applications. In the turbine engine, a fan (e.g., a fan, variable pitch propeller, etc.) draws air into the engine.

FIG. 1 is a schematic diagram of a control system 100 for maintaining a component 102 such as an engine of a powered system 106. In one embodiment, the component 102 is an engine on a wing 104 of an aircraft, but optionally may be an engine of another vehicle, an engine of a stationary power-generating system, or another type of component. The control system 100 includes one or more engine controllers 110. The engine controller 110 can be of any type, including but not limited to a computer, computing device, laptop computer, mobile device, tablet computer, smart phone, body-mounted device, wearable device, server, enterprise computer system, network of computers, or the like. The engine controller 110 includes one or more processors 112 that can also be of any type, including but not limited to a controller, microprocessor, microcontroller, digital signal processor, and the like that can receive, determine, compute and transmit information.

The processor 112 can have or operate based on algorithms and look-up tables inputted therein through programming or the like. In this manner, the processor 112 can make calculations based on parameters of the engine 102 and aircraft or compare such parameters to the look-up tables to make determinations. The processor 112 is in communication with a memory 114 that contains a database of information that is either inputted into the controller 110, determined by the processor 112 of the controller 110, or communicated from another controller or device, to be stored within the memory 114. The processor 112 and memory 114 are also in communication with a communication subsystem 116 that has input and output subsystems 118 and 120 to receive and transmit information and data for the controller 110. The communication subsystem 116 connects the one or more engine controllers 110 to other controllers and/or systems by one or more networks 122.

The network(s) 122 may be a cellular network, a local area network, a wide area network (e.g., Wi-Fi), a cloud, a virtual personal network (e.g., VPN), an Ethernet network, and/or a public network such as the Internet. The communication subsystem 116 may, alternatively or in addition, enable shorter-range wireless communications between the one or more engine monitoring controllers and other computing devices, using, for example, Bluetooth and/or other technology. Accordingly, the communication sub-system 116 may include one or more optical, wired and/or wireless network interface subsystems, cards, adapters, or other devices, as may be needed pursuant to the specifications and/or design of the particular engine controller.

A display module 124 is also in communication with the processor 112, memory 114 and communication subsystem 116. The display module 124 typically is a screen that displays information retrieved from the processor 112, memory 114 or communication subsystem 116 to convey information to the user.

A user interface subsystem 125 similarly is in communication with the other components of the engine controller 110, including the processor 112, memory 114, communication subsystem 116 and display module 124. In this manner a user my input information, data, historical data, algorithms, models and the like into the engine controller 110 and receive information as requested.

The control system 100 includes a monitoring system 226 that has one or more an engine monitoring controllers 210 that can be of any type, including but not limited to a computer, computing device, laptop computer, mobile device, tablet computer, smart phone, body-mounted device, wearable device, server, enterprise computer system, network of computers, or the like. The engine monitoring controller 210 includes a processor 212 that can also be of any type, including but not limited to a controller, microprocessor, microcontroller, digital signal processor, and the like that can receive, determine, compute and transmit information.

The processor 212 can make calculations based on parameters of the engine 102 and aircraft or compare such parameters to the look-up tables to make determinations. The processor 212 is in communication with a memory 214 that contains a database of information that is either inputted into the controller 210, determined by the processor 212 of the controller 210, or communicated from another controller or device, to be stored within the memory 214. The processor 212 and memory 214 are also in communication with a communication subsystem 216 that has input and output subsystems 218 and 220 to receive and transmit information and data for the controller 210. The communication subsystem 216 connects the one or more engine monitoring controllers to the one or more engine controllers 210 and to other controllers and/or systems by one or more networks 222.

The network(s) 222 may be a cellular network, a local area network, a wide area network (e.g., Wi-Fi), a cloud, a virtual personal network (e.g., VPN), an Ethernet network, and/or a public network such as the Internet. The communication subsystem 216 may, alternatively or in addition, enable shorter-range wireless communications between the one or more engine monitoring controllers and other computing devices, using, for example, Bluetooth and/or other technology. Accordingly, the communication sub-system 216 may include one or more optical, wired and/or wireless network interface subsystems, cards, adapters, or other devices, as may be needed pursuant to the specifications and/or design of the particular engine controller.

A display module 224 is also in communication with the processor 212, memory 214 and communication subsystem 216. The display module 224 typically is a screen that displays information retrieved from the processor 212, memory 214 or communication subsystem 216 to convey information to the user.

A user interface subsystem 225 similarly is in communication with the other components of the engine monitoring controller 210, including the processor 212, memory 214, communication subsystem 216 and display module 224. In this manner, a user my input information, data, historical data, algorithms, models and the like into the engine monitoring controller 210 and receive information as requested.

An engine performance monitoring system 226 is also in communication with the processor 212, memory 214 and communication subsystem 216 of the engine monitoring controller 210. The engine performance monitoring system 226 includes sensors 228 and 230 in the engine 102 that measure real-time parameters of the engine. In one embodiment, sensor 228 is a temperature sensor that measures the air temperature of air entering the engine and sensor 230 is a temperature sensor that measures the air temperature of the exhaust existing the engine 102. In another embodiment, one of the sensors 228 or 230 is a mass flow sensor. The sensors 228 and 230 take real time measurements that are communicated to the processor 212 and memory 214 of the engine monitoring controller 210.

The engine performance monitoring system 226 in one embodiment monitors the condition of the thermal barrier coating of the engine utilizing methods as presented in U.S. Pat. No. 9,395,301 that is incorporated by reference herein. Thus, the sensors 228 and 230 monitor coating parameters including temperature at the coating to utilize the methods presented in the '301 patent.

In this manner, the processor 212 can make determinations such as calculating fuel efficiency of the engine. Such determinations can then be compared to an engine profile created from historical data of similar engines or from test cell data from testing of the engine prior to use. Based on the comparison the processor 212 and thus controller 210 determines a date or range of dates for maintaining the engine for the individual aircraft. Alternatively, the real time measurements, data, information or determination of the one or more engine monitoring controllers are communicated to the one or more engine controllers 110 for similar determinations and calculations and to determine a date or range of dates for maintenance for the individual aircraft. The communication between the one or more engine controller 110 and engine monitoring controller 210 is provided through communication links, including wired and/or wireless, direct or indirect, connections.

The sensors 228 and 230 may include thermocouples that generate potentials representative of temperatures or changes in temperature in the air, a thermometer, or another device that can sense temperature and generate an output signal to the controller 210 that indicates temperature. The sensors 228 and 230 may also be a piezoelectric strain gauge, a capacitive pressure sensor, an electromagnetic pressure sensor, or other device that can sense pressure of the air and generate an output signal to the controller 210 that indicates the pressure. In one embodiment, one of the sensors 228, 230 or an additional sensor may be an oxygen sensor that measures the amount of oxygen conveyed to the engine. The controller 210 may monitor the rates of air flow through the engine during flight from mass flow sensors that are coupled with or included in the engine.

The one or more engine monitoring controllers 210 can be the engine controller of the aircraft 106. The one or more engine monitoring controllers 210 may be a Full Authority Digital Engine Controller (FADEC), a component thereof, or a separate module in communication with a FADEC (e.g., via one or more electronic communication links or networks). Optionally, the monitoring system 226 includes an on-board engine monitor, of a range of characteristics, such as the frequency of data acquisition.

The control system 100 can also optionally include a fleet management system 300 having one or more fleet operations controllers 310. The one or more fleet operations controllers 310 can be of any type, including but not limited to a computer, computing device, laptop computer, mobile device, tablet computer, smart phone, body-mounted device, wearable device, server, enterprise computer system, network of computers, or the like. The fleet operations controller 310 includes a processor 312 that can also be of any type, including but not limited to a controller, microprocessor, microcontroller, digital signal processor, and the like that can receive, determine, compute and transmit information.

The processor 312 can have algorithms and look-up tables inputted therein through programing or the like. In this manner, the processor 312 can make calculations based on parameters of the engine 102 and aircraft or compare such parameters to the look-up tables to make determinations. The processor 312 is in communication with a memory 314 that contains a database of information that is either inputted into the controller 310, determined by the processor 312 of the controller 310, or communicated from another controller or device, to be stored within the memory 314. The processor 312 and memory 314 are also in communication with a communication subsystem 316 that has input and output subsystems 318 and 320 to receive and transmit information and data for the controller 310. The communication subsystem 316 connects the one or more fleet operations controller 310 to other controllers and/or systems of the control system by one or more networks 322, including the one or more engine controllers or the one or more engine monitoring controllers.

The network(s) 322 may be a cellular network, a local area network, a wide area network (e.g., Wi-Fi), a cloud, a virtual personal network (e.g., VPN), an Ethernet network, and/or a public network such as the Internet. The communication subsystem 316 may, alternatively or in addition, enable shorter-range wireless communications between the one or more engine monitoring controllers and other computing devices, using, for example, Bluetooth and/or other technology. Accordingly, the communication sub-system 316 may include one or more optical, wired and/or wireless network interface subsystems, cards, adapters, or other devices, as may be needed pursuant to the specifications and/or design of the particular engine controller.

A display module 324 is also in communication with the processor 312, memory 314 and communication subsystem 316. The display module 324 typically is a screen that displays information retrieved from the processor 312, memory 314 or communication subsystem 316 to convey information to the user.

A user interface subsystem 325 similarly is in communication with the other components of the fleet operations controller 310, including the processor 312, memory 314, communication subsystem 316 and display module 324. In this manner a user my input information, data, historical data, algorithms, models and the like into the engine monitoring controller 310 and receive information as requested.

By using the one or more fleet operation controllers 310, in addition to single engine coating restoration schedule optimization, full fleet optimization is also considered. Portions of engine data and/or coating restoration schedule data, may be supplied to the one or more fleet operations controllers 310 and/or the one or more controllers of a coating restoration system. Therefore, the one or more fleet operations controllers 310 are configured to manage turbine engine coating restoration for a fleet of aircraft.

In one example, as the controllers 110 and/or 210 determine dates or ranges of dates maintenance should occur in individual aircraft, the one or more fleet operations controllers 310 receive this information for an entire fleet of aircraft. In this manner, the one or more fleet operation controllers 310 can determine if a predetermined percentage of the fleet exceeds a threshold percentage for maintenance down time to reschedule maintenance of at least one aircraft to ensure the proper amount of aircraft remain operating within the fleet.

In another example, as the controllers 110 and/or 210 determine dates or ranges of dates maintenance should occur in individual aircraft, the one or more fleet operations controllers 310 receive this information for an entire fleet of aircraft. In this manner, the one or more fleet operation controllers 310 can utilize an algorithm that utilizes all of the flight schedules of all of the aircraft that require maintenance in a given range of dates to determine the location that coating restoration for all of the aircraft being restored is to occur to minimize downtime of the aircraft under maintenance.

The control system 100 also includes one or more controllers 410 of a coating restoration system. The one or more controllers 410 of the coating restoration system can be of any type, including but not limited to a computer, computing device, laptop computer, mobile device, tablet computer, smart phone, body-mounted device, wearable device, server, enterprise computer system, network of computers, or the like. The engine controller 410 includes a processor 412 that can also be of any type, including but not limited to a controller, microprocessor, microcontroller, digital signal processor, and the like that can receive, determine, compute and transmit information.

The processor 412 can have algorithms and look-up tables inputted therein through programing or the like. In this manner, the processor 412 can make calculations based on parameters of the engine 102 and aircraft or compare such parameters to the look-up tables to make determinations. The processor 412 is in communication with a memory 414 that contains a database of information that is either inputted into the controller 410, determined by the processor 412 of the controller 410, or communicated from another controller or device, to be stored within the memory 414.

The memory 414 includes a restoration history database and a coating restoration parameters database. The restoration history database stores information related to the coating restoration history of the turbine engine system, such as, when was the date of the last coating restoration of the turbine engine and what coating restoration was performed. The coating restoration parameters database includes information related to the coating restoration regimens available to be used to restore a particular turbine engine, such as data on all available coating restoration regimens, which coating restoration regimens are available at which locations geographically, whether a coating restoration crew at a particular location is available to perform a coating restoration, and the like.

The processor 412 and memory 414 are also in communication with a communication subsystem 416 that has input and output subsystems 418 and 420 to receive and transmit information and data for the controller 410. The communication subsystem 416 connects the one or more controllers 410 of the coating restoration system to the other controllers and systems by one or more networks 422, including the one or more engine controllers, the one or more engine monitoring controllers or the one or more fleet operations controllers.

The network(s) 422 may be a cellular network, a local area network, a wide area network (e.g., Wi-Fi), a cloud, a virtual personal network (e.g., VPN), an Ethernet network, and/or a public network such as the Internet. The communication subsystem 416 may, alternatively or in addition, enable shorter-range wireless communications between the one or more engine monitoring controllers and other computing devices, using, for example, Bluetooth and/or other technology. Accordingly, the communication sub-system 416 may include one or more optical, wired and/or wireless network interface subsystems, cards, adapters, or other devices, as may be needed pursuant to the specifications and/or design of the particular engine controller.

A display module (not shown) is also in communication with the processor 412, memory 414 and communication subsystem 416. The display module (not shown) typically is a screen that displays information retrieved from the processor 412, memory 414 or communication subsystem 416 to convey information to the user.

A user interface subsystem (not shown) similarly is in communication with the other components of the one or more controllers 410 of the coating restoration system, including the processor 412, memory 414, communication subsystem 416 and display module (not shown). In this manner a user my input information, data, historical data, algorithms, models and the like into the one or more controllers 410 of the coating restoration system and receive information as requested.

Figure 2:
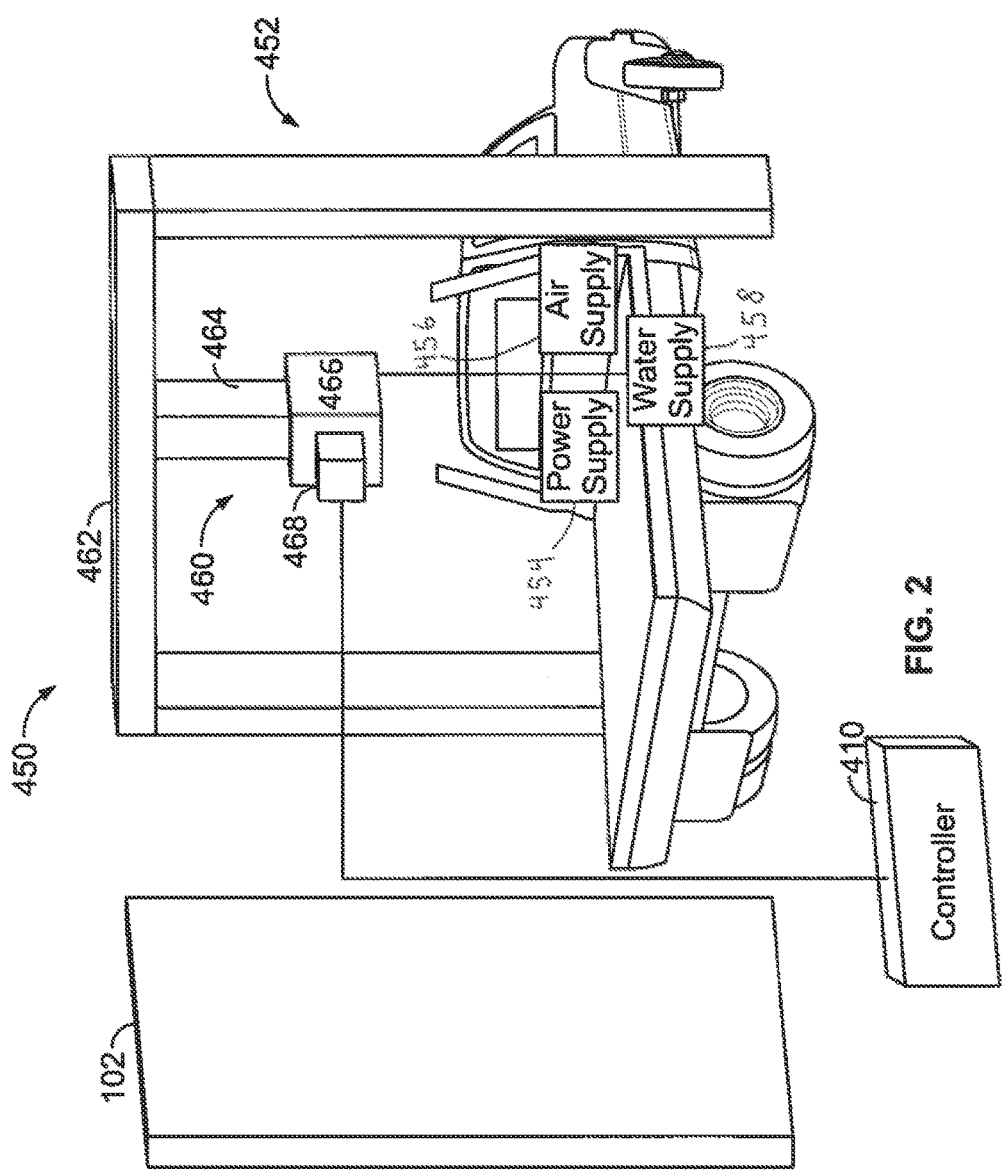
FIG. 2 is a schematic diagram of a coating restoration system.

FIG. 2 shows the coating restoration system 450 that is operated by and includes controller 410. The coating restoration system 450 includes a mobile supply unit 452 such as a truck or is incorporated into a work cart, trailer, or other type of vehicle or support structure. The mobile supply unit 452 includes a power supply 454, an air supply 456, a water supply 458 and a coating restoration unit 460 mounted on the mobile supply unit 452. The coating restoration unit 460 includes a rail 462 and glider 464 with an attachment mechanism 466 on the glider that attaches a spray nozzle 468 that receives a slurry and air to output a coating for a component such as a thermal barrier coating. The rail 462 and glider 464 system provide for 360° degree movement to coat any surface of the component. The coating restoration system 450 stores the restoration coating agent so that it can be delivered to the spray nozzle 468 for application in the turbine engine.

The one or more controllers 410 of the coating restoration system 450 are operated by an engine coating restoration service, such as at an A check, C check, or procedure at an airport. The one or more controllers 410 of a coating restoration system 450 is in communication with all of the other controllers 110, 210 and 310 of the control system 100. All historical data stored at the one or more controllers 410 of the coating restoration system 450 is communicated to all of the controllers 110, 210 and 310 within the control system 100 to be utilized in determinations, calculations, algorithms and as otherwise needed by the controllers 110, 210 and 310 within the control system.

The one or more controllers 410 of the coating restoration system 450 obtains and stores historical data about the engine or the engine's coating restoration history. This is through data inputted into the one or more controllers and data determined in real-time and stored within the memories of the one or more controllers 110, 210 and 310. The one or more controllers 410 of the coating restoration system 450 are configured to use the historical data to determine an engine coating restoration scheme for the operator. The one or more controllers 410 of the coating restoration system 450 communicate with the other controllers 110, 210 and 310 in the control system 100 to schedule maintenance intervals based upon certain parts or modules of the turbine engine that need replacement. Thus, the one or more controllers 410 of the coating restoration system 450 are configured to determine the amount of restoration required for an individual component or module. Consequently, the one or more controllers 410 of the coating restoration system 450 are configured to determine if an engine 102 merely needs a minor overhaul/restoration procedure, and based on the restoration required the one or more controllers 410 of the coating restoration system 450 initiate a coating restoration. As a result, the engine coating or coatings are restored and the engine is quickly returned to service, thereby extending the engine's efficiency until a major overhaul is required.

The one or more controllers 410 of the coating restoration system 450 are configured to issue a prompt or notification in order to prevent the occurrence of a scheduled coating restoration cycle, if the one or more controllers 410 of the coating restoration system 450 determines that the engine's removal from service is imminent (e.g., for regularly scheduled required maintenance). The one or more controllers 410 of the coating restoration system 450 include data in a database or memory regarding the date on which predetermined maintenance is to occur. The one or more controllers 410 of the coating restoration system 450 then compare a date of maintenance determined as a result of system parameters and if the date falls within a predetermined range, such as one month, of the date of the predetermined maintenance, the one or more controllers 410 of the coating restoration system 450 are configured to cancel the determined date of maintenance.

Thus, the one or more controllers 410 of the coating restoration system 450 are configured to coordinate coating restoration cycles with other maintenance schedules as well as operational schedules. The one or more controllers 410 of the coating restoration system 450 are configured to establish the best variation of cycle times in which the optimum parameters of engine coating restoration are determined, including the time interval between coating restoration(s), the duration of coating restoration(s), the particular mixture or composition of the coating restoration solution, and the like. The one or more controllers 410 of the coating restoration system 450 are configured to establish a predictive coating restoration schedule based on the historical data. The predictive coating restoration schedule can then be used by the engine manufacturer in order to better predict engine coating restoration as a function of minor and major overhaul intervals.

Figure 3:
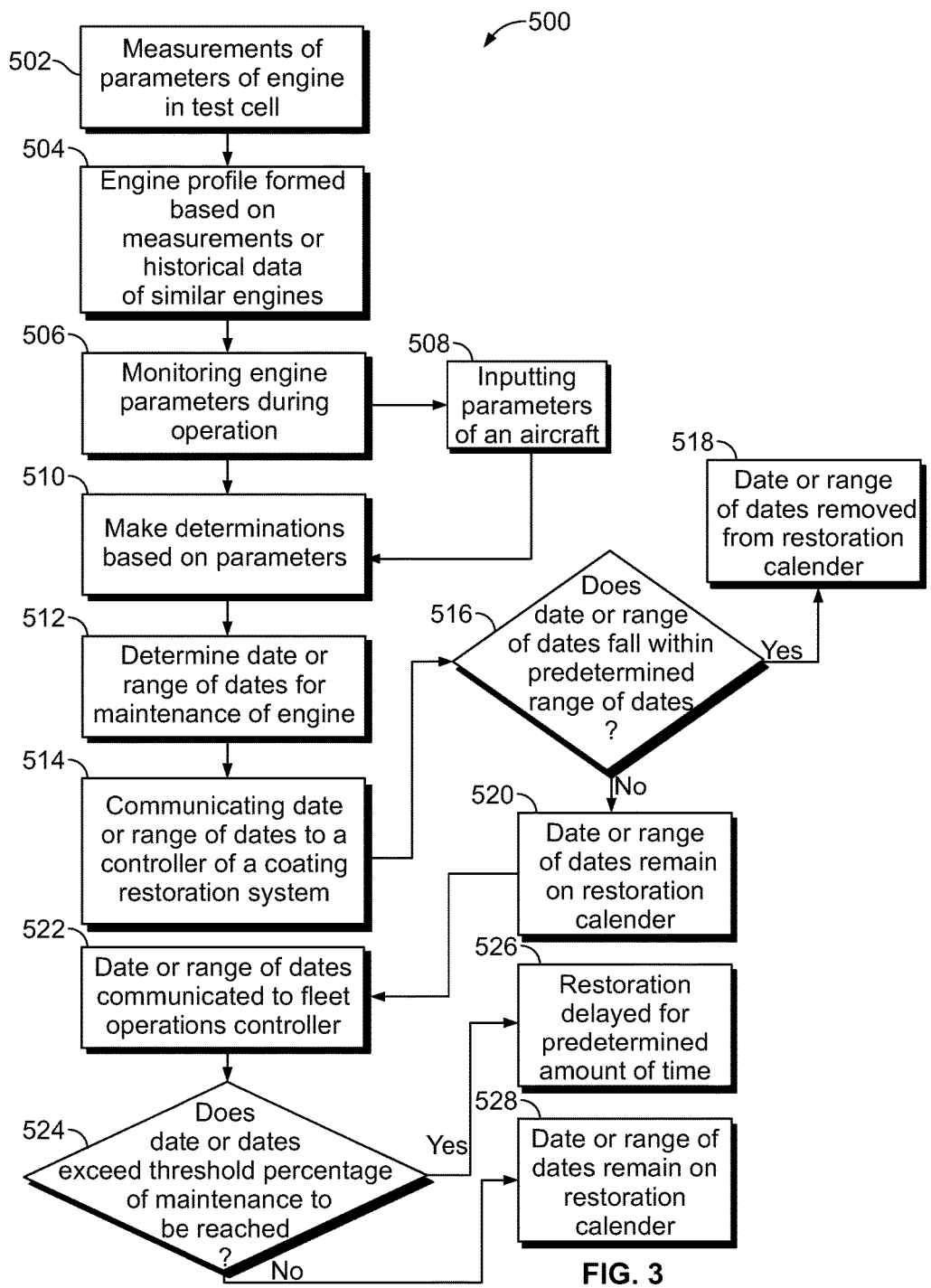
FIG. 3 illustrates a flow chart of a method for determining maintenance for a turbine engine.

FIG. 3 shows a method for determining maintenance of a turbine engine 500. At 502, the measurements of parameters of a turbine engine are taken in a test cell prior to use of the turbine engine. At 504, an engine profile is formed based the measurements or on historical data of similar engines and inputted or communicated to the controllers of a control system.

At 506, a controller monitors parameters of the engine during operation. These parameters can include engine temperature, different air temperatures at the engine, fuel consumption and the like. At 508, in an embodiment where the engine is on an aircraft, parameters of the aircraft are inputted and communicated to controllers in the control system. These parameters include environmental conditions during flight, flight durations, air speeds and the like.

At 510, a controller makes determinations based on the parameters of the engine and the aircraft (for such an embodiment). Based on these determinations the controller determines a date or a range of dates for maintenance of the engine to restore a coating at 512.

At 514, the determined date or range of dates is communicated to a controller of a coating restoration system. At 516, the controller of the coating restoration system compares the date or dates communicated to pre-determined maintenance date of the engine to determine if the initial determined date or range of dates falls within a range of dates prior to the pre-determined maintenance.

If at 516 the initial determined date or range of dates falls within the range of dates prior to the pre-determined maintenance, at 518, the controller of the coating restoration system cancels the date or range of dates determined and removes the engine or aircraft (in such an embodiment) from a restoration schedule. If at 516, the initial determined date or range of dates does not fall within the range of dates prior to the pre-determined maintenance, at 520 the controller of the coating restoration system leaves the determined date on the restoration schedule.

At 522, in an embodiment where the engine is on an aircraft and that aircraft belongs to a fleet of aircraft, the updated restoration schedule is communicated to a fleet operation controller. At 524, the fleet operation controller determines the percentage of aircraft in the fleet that are on the restoration schedule for the date or range of dates from maintenance.

At 526, if the percentage of aircraft in the fleet that are on the restoration schedule for the date exceeds a threshold percentage, the fleet operation controller will delay the restoration for a predetermined amount of time when the percentage falls below the threshold percentage. At 528, if the percentage of aircraft in fleet that are on the restoration schedule for the date does not exceed a threshold percentage the fleet operation controller leaves the determined date or range of dates on the restoration schedule.

Figure 4:
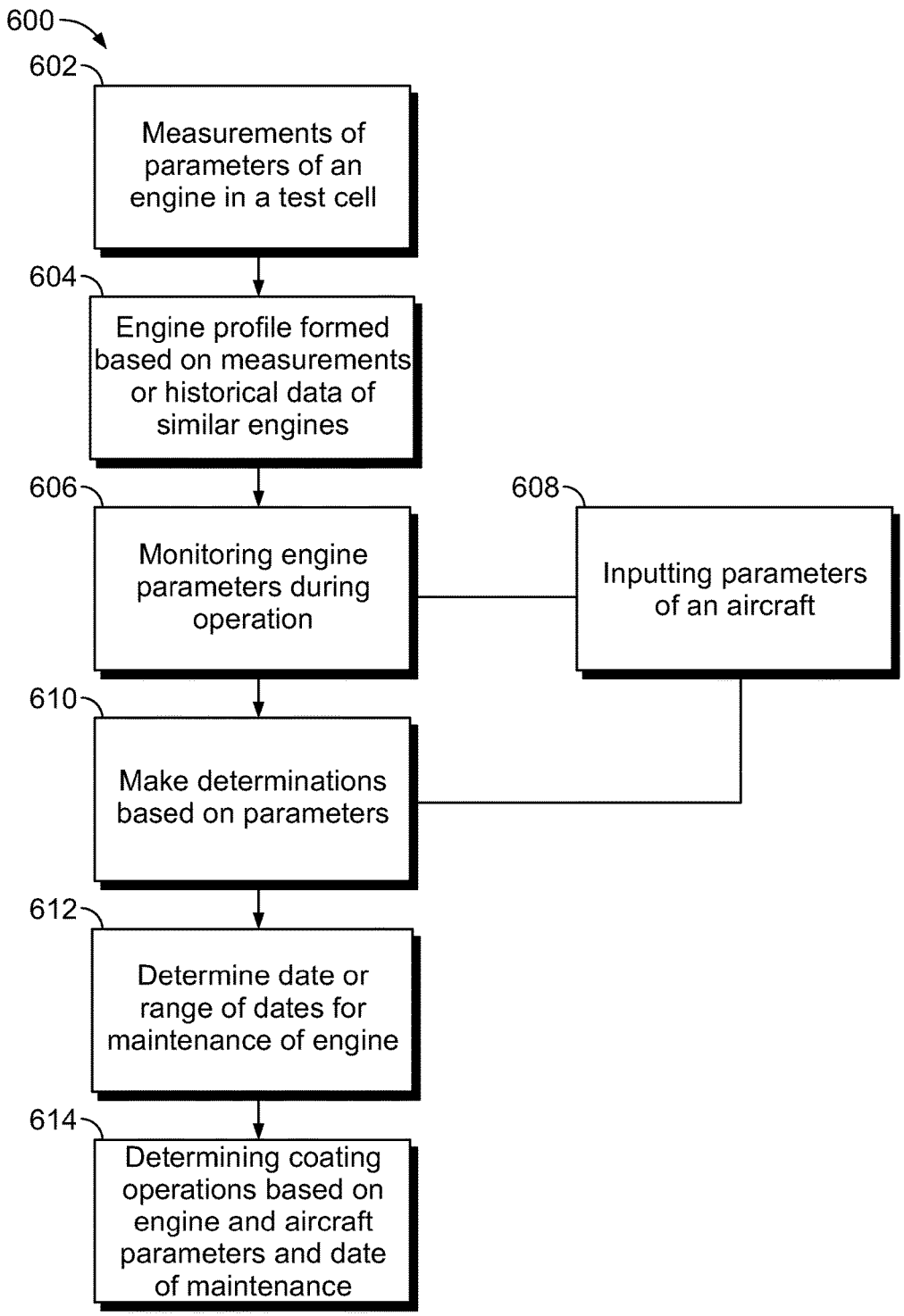
FIG. 4 illustrates a flow chart of a method of restoring a coating.

FIG. 4 shows a flow chart of a method of restoring a coating 600. At 602 the measurements of parameters of a turbine engine are taken in a test cell prior to use of the turbine engine. At 604 an engine profile is formed based the measurements or historical data of similar engines and inputted or communicated to the controllers of a control system.

At 606, a controller monitors parameters of the engine during operation. These parameters can include engine temperature, different air temperatures at the engine, fuel consumption and the like. At 608, in an embodiment where the engine is on an aircraft, parameters of the aircraft are inputted and communicated to controllers in the control system. These parameters include environmental conditions during flight, flight durations, air speeds and the like.

At 610, a controller makes determinations based on the parameters of the engine and the aircraft. Based on these determinations the control system determines a date or a range of dates for maintenance of the engine to restore a coating at 612.

At 614, on the date of restoration the controller of a coating restoration system determines based on the date of restoration and the determinations based on engine and aircraft parameters the surfaces of the engine to be coated, the amount of coating to be supplied and/or the consistency of the coating materials.

As an example of how the methods of FIGS. 3 and 4 work, when a turbine engine is manufactured for an aircraft, before securing the engine on the wing, test cell measurements are taken of the engine and inputted into the either the engine optimization controller, engine monitoring controller or both. This information is then communicated wirelessly to all of the controllers in the control system. During operation of the engine, the engine is utilized for the first time on January $1^{st}$. The engine monitoring controller receives inputs from the aircraft engine controller regarding flight information, including but not limited to environmental conditions including temperature and precipitation at take-off and landing, date and time of flight, air temperature changes, relative humidity, air quality, air speed and wind conditions for each flight during operation. Simultaneously, the engine monitoring controller receives inputs from engine sensors regarding the air temperature of the exhaust in the engine and fuel consumed. The information and data inputted and received is stored in the memory of the engine monitoring controller and communicated to the engine controller during all operations of the engine. The controllers utilize algorithms to determine the profile of the engine after completion of each flight based on the information and data gathered during operation and based on historical data.

In the example, after a flight on June $1^{st}$ of the same year, the calculated profile based on engine exhaust temperature is compared to the engine profile formed during testing, and a controller determines maintenance is not needed. The algorithm then determines based on the historical data of the engine parameters to that date, at the current pace of wear the thermal barrier coating of the engine should be restored on September 1 of the same year. This information is communicated to all of the controllers in the control system including the one or more controllers of the coating restoration system and the one or more fleet operation controllers. The one or more controllers of the coating restoration system then compare the September 1 date to the regularly scheduled maintenance date of the engine, which is January 1 of the next year. Because the September 1 date is more than one month away, the one or more controllers of the coating restoration system schedule the engine for maintenance on September 1 of this year. The information is then communicated to the other controllers of the control system including the one or more fleet operations controllers.

In the example, the one or more fleet operations controllers receive the information that the engine is scheduled for restoration of the thermal barrier coating on September 1 of this year. The fleet operations controller then calculates the percentage of aircraft in the fleet that are currently scheduled for maintenance on September 1 is 2% or less than the 3% threshold percentage of aircraft in the fleet undergoing maintenance for that day. As a result, the fleet operations controller does not change the date of the scheduled maintenance and the engine is scheduled for maintenance on September 1. On the day of maintenance, the one or more controllers of the coating restoration system have the coating restoration system provide the pre-determined amount of coating of the engine to restore the engine profile.

In a second example, the same steps occur as the first example, wherein after the June $1^{st}$ flight a controller makes an initial determination that the maintenance is to occur on September 1 of this year. This time the engine profile is determined as a result of monitoring the thermal barrier coating using methods outlined in U.S. Pat. No. 9,395,301. Again the one or more controllers of the restoration system determines that regularly scheduled maintenance is not until January 1 of next year and leaves the aircraft on the restoration schedule for maintenance for September 1 of this year and communicates this information to the fleet operations controller. In this second example, the fleet operations controller calculates the percentage of aircraft scheduled for maintenance is 4%, above the threshold percentage of aircraft. The fleet operations controller then determines the maintenance date to be October 1 of this year when only 2% of aircraft are scheduled for maintenance. The new maintenance date is then communicated to the other controllers in the control system including the one or more controllers of the coating restoration system that again compares date to the regularly scheduled maintenance and because it is more than a month away, keeps the October 1 maintenance date scheduled.

In the second example, when the October 1 maintenance occurs, the one or more controllers of the coating restoration system restores the thermal barrier coating by increasing the amount of coating and surface area of the engine the spray device covers compared to the amount of coating and surface area coated if the maintenance occurred on September 1 as was originally scheduled. In this manner, the coating restoration system compensates for the late maintenance by enhancing the restoration.

In a third example, the same steps occur as the first example with the engine profile being determined based on engine efficiency. In this third example, after the June $1^{st}$ flight a controller makes an initial determination that the maintenance is to occur in a range of dates between December 7-14 of this year. These initial dates of maintenance are scheduled and communicated to the other controllers including the one or more controllers of the coating restoration system. The one or more controllers of the coating restoration system then compares the scheduled range of dates to the regularly scheduled maintenance of the engine on January 1 of the next year and determines this is within one month of the regularly scheduled maintenance. Thus, the one or more controllers of the coating restoration system moves the maintenance of the thermal barrier coating to the date of the regularly scheduled maintenance, cancelling the December 7-14 maintenance.

In the third example, at the regularly scheduled maintenance, similar to the second example, the amount of coating and surface area of the engine the spray device covers increases based on the later maintenance date scheduled compared to the original date calculated by engine monitoring controller. Thus, additional protection is provided.

In a fourth example, the same steps occur as the first example, only after the June $1^{st}$ flight the algorithm makes an initial determination that the maintenance is not to occur until February 1 of the next year. This initial date of maintenance is scheduled and communicated to the other controllers including the one or more controllers of the coating restoration system. The one or more controllers of the coating restoration system then compares the scheduled date to the regularly scheduled maintenance of the engine on January 1 of the next year and determines this is after the regularly scheduled maintenance. Thus, the one or more controllers of the coating restoration system moves the maintenance of the thermal barrier coating to the date of the regularly scheduled maintenance, cancelling the February 1 maintenance.

In the fourth example, at the regularly scheduled maintenance, the amount of coating and surface area of the engine the spray device covers decreases compared to the amount and surface area if maintenance would have occurred on February 1. Thus, based on the earlier maintenance date scheduled compared to the original date calculated by engine monitoring controller not as much restoration is required and the restoration application is altered.

In an additional example the engine monitoring controller monitors the amount of engine cycles and the average ambient temperature of the plane during operation. Based on these parameters the control system utilizes a look up table to determine a maintenance date for the engine.

In another example the engine monitoring controller or the engine optimization controller monitors historical data or real time data of engine and airplane parameters. Such parameters include one or more of an engine exhaust temperature, a condition of the coating of the engine, engine fuel flow, compressor exit pressure, compressor exit temperature, engine derating, engine speed, engine cycles, engine power use, environmental conditions, ambient airplane temperature or dates of engine use. Based on one or more of these parameters, the control system determines a maintenance date for the engine. The system on the maintenance date applies an additive to increase the useful life of the engine to greater than 100%. For example, if an initial coating on or in an engine has a useful life of 1,000 engine cycles but, after some use of the engine the coating has a remaining useful life of 750 engine cycles, application of the additive to the coating may increase the useful life of the coating to 1,100 total engine cycles or may increase the useful life by an additional 300 engine cycles such that the actual total useful life of the coating is extended beyond the initial 100%.

As another example, the determination of when to extend a useful life of a coating in or on an engine may not be based on a static or absolute date, but may be a relative time. For example, due to different engines being used different amounts, identical coatings on different engines may need restoration or application of additives at different times. The one or more controllers described herein may direct application of the additive to a coating as a number of engine cycles. The additive may need to be applied before expiration or upon expiration of the number of engine cycles. Optionally, one or more controllers described herein may direct application of the additive to a coating as a trigger point. The trigger point can be a point in time at which the additive should be applied to the coating before continued use of the engine after the trigger point occurs. A trigger point can be a number of engine cycles, a number of hours of engine usage, or the like.

In one embodiment, a control system is provided. The control system has one or more controllers configured to determine when to extend a life span of a coating of an engine by applying an additive to the coating based on one or more monitored parameters of the engine. The one or more controllers also are configured to, direct application of the additive onto a coating of the engine based on the monitored parameters of the engine.

In one embodiment, the coating is a thermal barrier coating.

In one embodiment, the one or more controllers include an engine optimization controller and a fleet operation controller. The engine optimization controller is configured to determine an initial maintenance date and the fleet operation controller is configured to determine the maintenance date. In one embodiment, the determined maintenance date is later than the initial maintenance date. In this embodiment, the one are more controllers are configured to increase the amount of coating sprayed on the engine based on the maintenance date determined by the fleet operation controller.

In one embodiment, the one or more controllers include an engine optimization controller and a controller of a restorative coating system. The engine optimization controller determines an initial maintenance date based on the monitored parameters of the engine and the controller of the restorative coating system is configured to determine the maintenance date. In one embodiment, the determined maintenance date is later than the initial maintenance date. In this embodiment, the one are more controllers are configured to increase the amount of coating sprayed on the engine based on the maintenance date determined by the controller of the restorative coating system.

In one embodiment, the monitored parameter of the engine includes one or more of an engine exhaust temperature, a condition of the coating of the engine, engine fuel flow, compressor exit pressure, compressor exit temperature, engine derating, engine speed, engine cycles, engine power use, environmental conditions, ambient airplane temperature or dates of engine use.

In one embodiment, the one or more controllers are configured to determine an amount of additive to apply onto the coating based on the monitored parameters. In another embodiment, the one or more controllers are configured to determine the type of additive to apply onto the coating based on the monitored parameters.

In one embodiment, a method of coating an engine is provided. Steps include monitoring engine parameters with one or more controllers and determining an engine maintenance date with the one or more controllers based on the monitored engine parameters. A coating restoration system having a mobile spray device is provided and coats the engine with the spray device on the engine maintenance date based on the monitored engine parameters.

In one embodiment, the method additionally provides the step of determining the engine maintenance date comprises the steps of testing the engine to form an engine profile and comparing the monitored engine parameters to the formed engine profile to determine an initial engine maintenance date. The initial maintenance date is communicated to a fleet operation controller and the percentage of aircraft in a fleet undergoing maintenance on the engine maintenance date is determined. The engine maintenance date is then determined based of the percentage of aircraft in a fleet undergoing maintenance on the engine maintenance date. In one embodiment, when the percentage of aircraft is above a threshold percentage the determined engine maintenance date is different than the initial engine maintenance date.

In one embodiment, the step of determining the engine maintenance date comprises the steps of testing the engine to form an engine profile and comparing the monitored engine parameters to the formed engine profile to determine an initial engine maintenance date. The initial maintenance date is communicated to a controller of a restorative coating system. Then the initial engine maintenance date is compared to a regularly scheduled maintenance date and the maintenance date is determined based on the regularly scheduled maintenance date. In one embodiment, the determined engine maintenance date is different than the initial engine maintenance date. In this embodiment, the controller of the restorative coating system can increase an amount of coating based on the engine maintenance date being different than the initial engine maintenance date. In this embodiment, the controller of the restorative coating system can change a spray pattern of the spray device based on the engine maintenance date being different than the initial engine maintenance date. In this embodiment, the controller of the restorative coating system can change the consistency of spray based on the engine maintenance date being different than the initial engine maintenance date.

In one embodiment a control system is provided with one or more controllers configured to monitor one or more parameters of an engine. The one or more controllers also are configured to determine an additive application to direct on the engine based on the one or more monitored parameters of the engine. The additive application in one embodiment extends the life of the engine to greater than 25% of a measured initial life span of the engine. In another embodiment the one or more controllers also are configured to determine when the additive application is directed on the engine.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A control system comprising:
   one or more controllers configured to determine when to extend a life span of a coating of an engine by applying an additive to the coating based on one or more monitored parameters of the engine, the monitored parameters including one or more of a condition of the coating, an operational parameter of the engine, a comparison between an engine output and a designated output, or an environmental condition;
   at least one processor; and
   memory operatively coupled to the at least one processor, the memory comprising a restoration history database and a coating restoration parameters database,
   wherein the restoration history database comprises a coating restoration type and a date that a previous coating restoration was performed on the engine,
   wherein the one or more controllers also are configured to direct application of the additive onto the coating of the engine based on the monitored parameters of the engine.

2. The control system of claim 1
   wherein the coating restoration parameters database comprises information relating to at least one available coating restoration regimen, and
   wherein the coating is a thermal barrier coating.

3. The control system of claim 1 further comprising:
   at least one sensor operatively coupled to the one or more controllers,
   wherein the monitored parameters include a presence of spalling in the coating as the condition of the coating.

4. The control system of claim 3 wherein the monitored parameters include one or more of an engine fuel flow, a compressor exit pressure, or a compressor exit temperature as the operational parameter of the combustor of the engine, and wherein the at least one sensor comprises at least one coating temperature sensor.

5. The control system of claim 2 further comprising:
at least one sensor operatively coupled to the one or more controllers,
wherein the at least one sensor transmits real time measurements to the memory and the at least one processor, and
wherein the monitored parameters include one or more of an exhaust temperature, derating of the engine, engine overdriving, engine speed, a number of operational cycles of the engine.

6. The control system of claim 3, the at least one sensor further comprising:
a first sensor, the first sensor positioned to measure an air temperature at an engine inlet; and
a second sensor, the second sensor positioned to measure an air temperature at an engine exhaust,
wherein the monitored parameters include at least one of a presence of dust detected in the operating environment of the engine and an amount of dust detected in the operating environment of the engine.

7. The control system of claim 1 wherein the operational parameter of the engine includes an operational parameter of one or more of a combustor, a turbine shroud, and a combustor fuel nozzle of the engine, and
wherein the engine comprises a multi-shaft turbofan gas turbine engine.

8. The control system of claim 1 wherein the one or more controllers are configured to determine when to extend the life span of the coating by determining a number of operational cycles that the engine performs before the additive is applied to the coating.

9. The control system of claim 1 wherein the one or more controllers are configured to determine when to extend the life span of the coating by determining a trigger point in time at which the additive is to be applied to the coating.

10. The control system of claim 1 wherein the one or more controllers are configured to determine when to extend the life span of the coating by determining a maintenance date by which the additive is to be applied to the coating.

11. The control system of claim 1 wherein the one or more controllers are configured to determine a residual useful life span of the coating based on the monitored parameters and to communicate the residual useful life span to an operator.

12. The control system of claim 1 wherein the engine is a turbine engine of an aircraft,
wherein the engine comprises:
a turboprop engine; and
a variable pitch propeller.

13. The control system of claim 1 wherein the one or more controllers are configured to determine an amount of additive to apply onto the coating based on the monitored parameters.

14. The control system of claim 1 wherein the one or more controllers are configured to determine a type of additive to apply onto the coating based on the monitored parameters.

15. A method comprising:
monitoring parameters of an engine having a coating, the parameters including one or more of a condition of the coating, an operational parameter of a combustor of the engine, a comparison between an engine output and a designated output, or an environmental condition to which the engine is exposed during operation;
determining when to extend a life span of the coating of the engine by applying an additive to the coating based on one or more of the parameters of the engine that are monitored, and
directing, by one or more controllers, an application of the additive onto the coating of the engine based on the monitored parameters of the engine, wherein directing, by one or more controllers further comprises providing a coating restoration unit, wherein the coating restoration unit comprises the one or more controllers, the coating restoration unit further comprising:
at least one rail;
at least one glider coupled to the at least one rail;
at least one mechanism attached to the glider; and
at least one spray nozzle attached to the at least one mechanism, the at least one spray nozzle operatively coupled to the one or more controllers,
wherein the at least one rail and the at least one glider provide 360° degree movement of the at least one spray nozzle for applying the additive to any surface of the coating of the engine.

16. The method of claim 15 further comprising directing application of the additive onto the coating of the engine based on the parameters of the engine that are monitored.

17. The method of claim 16,
wherein the coating is a thermal barrier coating.

18. The method of claim 17 wherein the monitored parameters include a presence of spalling in the coating as the condition of the coating, and
wherein the coating restoration unit increases the amount of the additive applied to the coating of the engine compared to an amount of additive applied to the coating assuming an earlier date of maintenance.

19. The method of claim 17 wherein the monitored parameters include one or more of an engine fuel flow, a compressor exit pressure, or a compressor exit temperature as the operational parameter of the combustor of the engine,
wherein the at least one spray nozzle receives a slurry and air for outputting the additive onto the coating.

20. The method of claim 15 wherein the monitored parameters include one or more of derating of the engine, engine overdriving, engine speed, or auxiliary power use of electric current generated based on movement of the engine as the comparison between the engine output and the designated output, and
wherein determining when to extend a life span of the coating of the engine further comprises determining when to extend a life span of the coating of the engine based at least partially on data of the engine in a test cell.

21. The method of claim 15 wherein the monitored parameters include one or more of a presence or an amount of dust.

22. The method of claim 15 wherein determining when to extend the life span of the coating includes determining one or more of:
a trigger point in time at which the additive is to be applied to the coating, and
a maintenance date by which the additive is to be applied to the coating.

23. A control system comprising:
one or more controllers configured to monitor one or more parameters of an engine having a thermal barrier coating, the one or more parameters including one or more of a presence of spalling in the coating as the condition of the coating, an engine fuel flow, a compressor exit pressure, a compressor exit temperature, an exhaust temperature, derating of the engine, engine overdriving, engine speed, a number of operational cycles of the engine, auxiliary power use of electric current generated based on movement of the engine, a presence of dust in an environment where the engine operates, or an ambient temperature of the environment where the engine operates, at least one processor; and memory operatively coupled to the at least one processor, the memory comprising a restoration history database and a coating restoration parameters database, wherein the restoration history database comprises a date that a previous coating restoration was performed on the engine, wherein the coating restoration parameters database comprises information relating to at least one available coating restoration regimen, and wherein the coating is a thermal barrier coating, wherein the one or more controllers also are configured to direct application of an additive onto the coating of the engine based on the one or more parameters of the engine that are monitored.

24. The control system of claim 23 further comprising a coating restoration system the coating restoration unit further comprising:

at least one rail;

at least one glider coupled to the at least one rail;

at least one mechanism attached to the glider; and at least one spray nozzle attached to the at least one mechanism, the at least one spray nozzle operatively coupled to the one or more controllers, wherein the coating restoration system is mounted to a transport vehicle.

* * * * *